United States Patent [19]

Masri et al.

[11] 4,349,347
[45] Sep. 14, 1982

[54] WOOL SCOURING

[75] Inventors: Merle S. Masri, Emeryville, Calif.; Brian Robinson; James D. M. Gibson, all of Ilkley, England

[73] Assignee: Wool Development International Limited, London, England

[21] Appl. No.: 184,368

[22] Filed: Sep. 5, 1980

[30] Foreign Application Priority Data

Sep. 7, 1979 [GB] United Kingdom ............... 7931026

[51] Int. Cl.³ ................................................ D01C 3/00
[52] U.S. Cl. ........................................... 8/139; 8/141; 8/158; 68/18 D
[58] Field of Search ................. 8/139, 141, 158; 210/705

[56] References Cited

U.S. PATENT DOCUMENTS

| | | | |
|---|---|---|---|
| 944,957 | 12/1909 | Eberhard | 8/139 |
| 2,762,681 | 9/1956 | Crowley | 8/139 |
| 3,440,167 | 4/1969 | Clark et al. | 8/139 |
| 4,124,502 | 11/1978 | Leman | 210/705 |

FOREIGN PATENT DOCUMENTS

| | | | |
|---|---|---|---|
| 770198 | 10/1967 | Canada | 210/705 |
| 50-30906 | 3/1975 | Japan | 8/141 |
| 233842 | 5/1925 | United Kingdom . | |
| 618895 | 3/1949 | United Kingdom . | |

OTHER PUBLICATIONS

Degremont, Water Treatment Handbook 4th Ed. (1973) pp. 116-117.

*Primary Examiner*—Maria Parrish Tungol
*Attorney, Agent, or Firm*—Harold L. Stowell

[57] ABSTRACT

In wool scouring systems in which scouring liquor is continuously withdrawn from the scouring bowls for separation of solid contaminants and wool grease and then recycled to the bowls, improved separation of solids is achieved by adding a soluble silicate, and preferably also a polyelectrolyte to the liquor before solids separation. Silicate can advantageously replace soda as scouring agent. Improved operation can also be obtained by controlled flow down from the circulatory system, as at 27, and by passing the jet phase from a disc centrifuge 17 to a decanter centrifuge 15 for further separation of solids. Alternatively, the entire liquor circulation may be passed first to the disc centrifuge and only the jet phase to the decanter, the middle liquor phase being recycled.

10 Claims, 3 Drawing Figures

WOOL SCOURING

This invention relates to improvements in wool scouring.

Raw wool contains large quantities of contaminants, up to 50% by weight, which consists mainly of dirt in the form of sand, clay and the like, wool grease, and suint, which is comprised of inorganic salts left by sweat. Consequently the first process raw wool is subjected to is scouring to remove these contaminants. Naturally, scour effluents are very heavily contaminated and the cost of discharging such effluents to the sewer is commensurately high.

Recent developments in the scouring process have provided systems which recycle scouring liquors, removing contaminants at various points in the cycle. In this way the wool grease, a valuable commodity in a pure form, can be separated for example in a disccentrifuge, and the solid contaminants are removed in the form of a semi-solid sludge which is easily disposed of.

Examples of such systems are the CSIRO "Lo-flo" system and the WRONZ "Mini-bowl" system, both of which use much lower volumes of liquor than conventional systems. The former, described in Belgian Pat. No. 862 228 uses wash-plate scouring bowls and allows the recycled liquor to build up a concentration of contaminants, especially suint, until "concentration destabilisation" takes place, which greatly aids the separation and removal of wool grease from the liquor. This system is intended to operate without any addition of chemical agents, other than detergents and builders, but we have found that in certain circumstances the build-up of contaminants can exceed the optimum value for concentration destabilisation, with deleterious effects on scouring efficiency and contaminant removal. The WRONZ systems use immersion scouring bowls, although the "mini-bowls" are of much lower capacity than conventional bowls, and the dirty scour liquor is allowed to settle in a heavy solids settling tank (HST) before part is recycled and part (e.g. about 25%) discharged to the sewer. Heavy solids are periodically discharged from the base of the HST.

The present invention seeks to provide methods of assisting the separation of contaminants in recycling liquor scouring systems.

According to a first aspect of the present invention there is provided a method of assisting the separation of contaminants from scouring liquors in recycled liquor wool scouring systems which comprises adding a silicate flocculating agent to the liquor.

The actual separation of contaminants is carried out in most closed circuit scour systems by one or more centrifuges. The most advantageous position to add the silicate flocculating agent is immediately before the first centrifuge.

The silicates used may be metasilicates formed by the reaction of an alkali, for example caustic soda, with silica in various molar proportions, for instance from 1:1 to 1:4. Especially useful silicates are those having ratios of 1:1 to 1:3.3 or mixtures thereof. These silicates are preferably employed in the amount of from 0.1% to 2% on the weight of wool (o.w.w.). Since the scour liquor normally contains a builder such as sodium carbonate, the silicate may be used to replace all or part of this, in which case the chemical costs are not increased by the use of silicates, especially as the weight of silicate needed is less than the weight of carbonate replaced.

In addition to the use of silicates, it has been found that the addition of a polyelectrolyte, especially a polyethyleneimine or a polyacrylamide, enhances the separation effect.

The use of silicates in connection with wool scouring is surprising, since alkali metal silicates because of their alkaline nature might damage the wool. However, possibly because of the short residence time in the scouring systems to which this invention relates, it has been found that there is no significant damage to the scoured wool attributable to the silicates used according to the invention.

It has been found that the use of silicates in accordance with this invention enables the centrifuges to operate very much more efficiently, removing the solids from the liquor as a thick sludge (of about 50-60% solid content), which is relatively easily disposed of, while the wool grease is separated as an emulsion known as "cream". The cream produced when employing the process of the invention has been found to be exceptionally clean and rich in lanolin. Since clean wool grease is a valuable product in its own right, this represents a substantial additional benefit of the invention.

The ability of the silicates to occlude and coagulate the organic contaminants and the inorganic contaminants (clay and sand) as precipitated sludges is related to the gelling behaviour of silicate in solution as a function of pH. Rapid gelling of silicate solutions in water occurs roughly in the range of pH 11 to 5 and the exact behaviour may be influenced by the presence of other materials in solution. In scour liquors it has been found that rapid satisfactory occulsion occurs between pH 9 and 6, preferably near neutral pH. Thus it may be advantageous, when using silicates for separation of contaminants in the circulating scour liquor, to adjust the pH near to neutral by the further addition of buffering chemicals such as phosphoric or other acid, dihydrogen potassium phosphate, aluminium chloride or sulfate, magnesium chloride or sulfate, calcium chloride or sulfate, calcium chloride or similar agents. It might be thought that the continuous addition of these persistent chemicals to the circulating liquors would result in the whole circuit liquor approximating to a near neutral pH condition, and this might conceivably interfere with the scouring function of the liquor, which is usually associated with a slightly alkaline pH. Surprisingly, scouring with neutral liquors (pH 7 to 8) has been found to be extremely efficient, as judged visually and by chemical analysis of the wool and the scour liquors. In fact, higher recovery of top grease of higher quality has been obtained from the liquors under these conditions.

Another group of water soluble contaminants of raw wool, which build up to high concentrations (about 12% in four hours) in the circulating liquor is suint, which is the potassium, and to some extent sodium, salts of carboxylic fatty acids originating in the sweat. Their presence in the liquor is desirable to a certain extent, since they help in the establishment of "concentration destabilisation" and, being soaps by nature, have themselves a cleansing action. Beyond a desirable level, however, the build-up of suint in the liquor becomes undesirable, unduly adding to the build-up of high total solids concentration in the liquor. Also, since the wool being scoured, in its countercurrent movement from the scouring bowls to the succeeding rinse-immersion bowls, carries with it part of the liquor from the scouring bowls as wet pick up, the immersion rinse bowls may thus become unduly contaminated with suint if the suint concentration is allowed to build up in the scouring bowls. Further, since suint is organic in nature, its transfer to the rinse bowls and subsequently to the sewer contributes to an increased chemical oxygen demand (COD) in the effluent.

It is therefore desirable to limit the concentration of suint by providing means for its removal from the circulating liquor. The use of silicates contributes to some removal in the sludge, as judged by chemical analysis of the sludge, which may show between 5 and 10% suint. A further removal of suint is easily accomplished by converting the potassium salts of suint in the circulating liquor into insoluble calcium salts through simple ionic reaction, by adding to the liquor some soluble calcium salt such as calcium chloride. This addition is advantageously made at a point in the circuit where the precipitated salts will soon be subjected to centrifigal removal with the rest of the sludge, thus limiting the return of the salt to the circulation as insoluble particles and their potential deposition on the wool.

Another advantage of using the divalent calcium ion is that any excess of the ion not used for precipitating the suint is used ionically to replace the monovalent sodium ion in the silicate, thereby tending to cross link the silicate and forming more insoluble products in the form of silicates. This property is shared with other divalent or multivalent ions, such as magnesium or aluminium ions.

In the normal operation of the CSIRO process of Belgian Pat. No. 862 228, the scour liquor is fed in counter-current from each scouring bowl towards the input of raw wool, and from the first (and therefore most highly contaminated) bowl to a decanter centrifuge, then to a disc centrifuge, and thence back to the line of bowls. In this mode the decanter handles the whole liquor flow, typically 100 l/min. It has now been found that if this sequence is reversed, so that the liquor reaches the disc centrifuge first, then the decanter can be used to handle only the solids-rich bottom or "jet phase" from the disc centrifuge, representing about 20-25% of the total flow. In this way the decanter is used more efficiently and a better solids separation is obtained, especially where the total flow would approach the operational limit or hydraulic capacity of the decanter centrifuge.

In an alternative arrangement, the jet phase only of a disc centrifuge operating in the normal mode on the output of the decanter centrifuge is recycled to the decanter for further separation of solids therefrom. This does not, however, reduce the volume of liquor or hydraulic load handled by the decanter centrifuge.

Thus a second aspect of the present invention provides a recycling liquor scouring system in which the contaminated liquor is fed to a disc centrifuge and the jet phase from the latter is then fed to a decanter centrifuge and the centrifuge liquors recycled. In preferred embodiment the contaminated liquor is fed first to the disc centrifuge, where a lanolin-rich cream and a solids-rich jet stream are separated from the liquor, the clarified liquor stream being recycled to the scouring bowls and the jet stream passed to the decanter centrifuge.

Moreover, if this aspect of the invention is combined with the use of silicates and other auxiliary chemicals as described above, exceptionally good results are obtained, with near theoretical removal of clay and dirt from the circulating liquor.

A further modification to recycling liquor of so-called "closed cycle" systems of the type described, which in certain circumstances can prove beneficial, is to provide for restricted outflow of contaminated liquor at an appropriate point in the cycle. Although, in theory, systems of this type have no liquor outflow (contaminants being removed entirely by the centrifuges, and the cleaned liquor recirculated), in practice clay, sand and dirt can build up in the liquor and/or settle in certain parts of the circulatory pipework, and a restricted outflow at such a point can improve the efficiency of the system.

Thus a third aspect of the present invention, which may be employed alone or with either or both of the previous aspects, comprises the provision in a recycling liquor system of a controlled partial discharge of the liquor whereby solids accumulated in the system are dislodged.

The invention will be described further, by way of example, with reference to the accompanying drawings and the following Examples.

Figure 1:
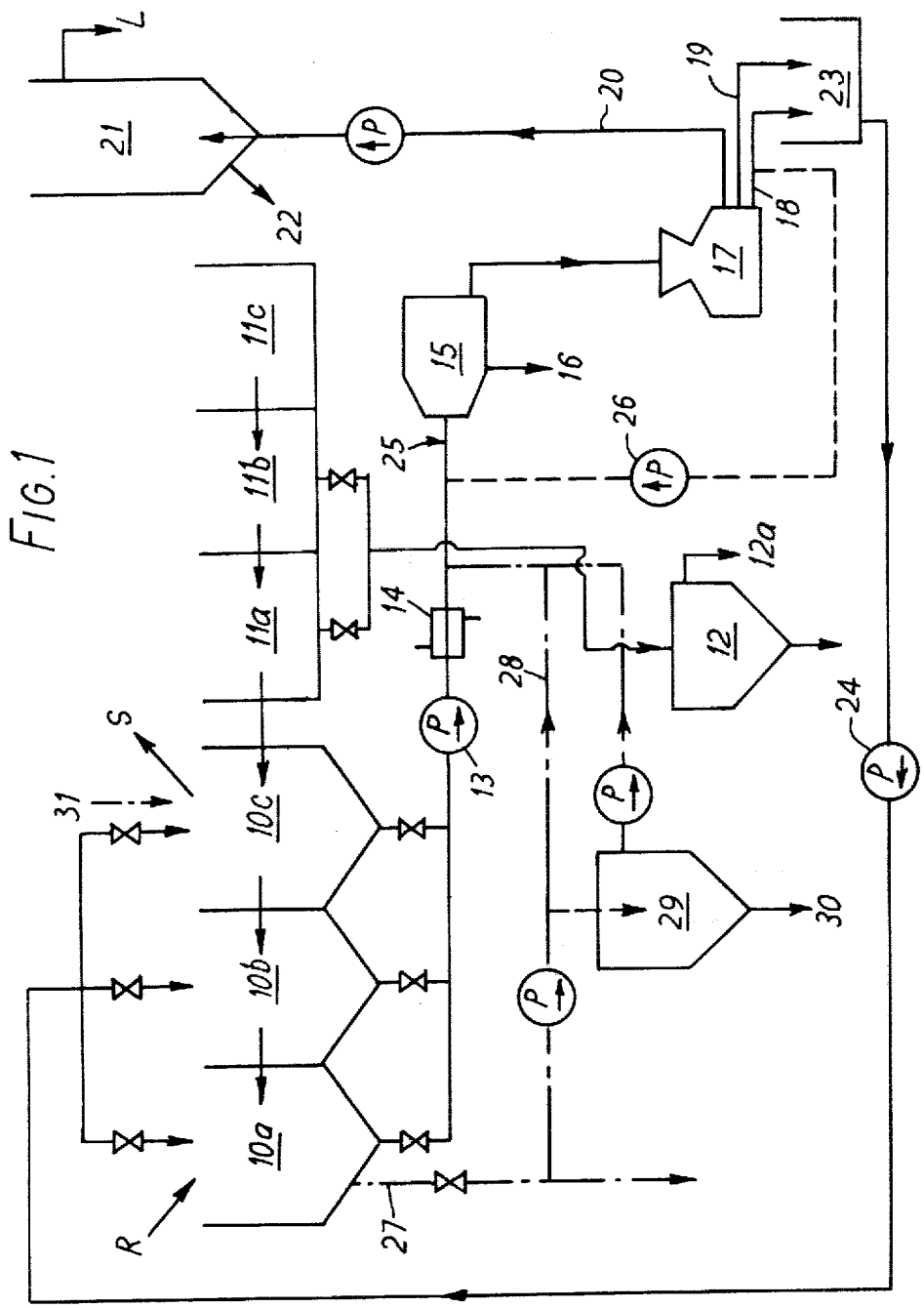
FIG. 1 is a flow diagram of a conventional CSIRO "Lo-flo" wool scouring system and of modifications incorporating features of this invention.

The recycling liquor scouring system shown in FIG. 1, in continous lines, comprises three adjacent wash-plate scouring bowls 10a, 10b and 10c for example of 1000 l capacity each, through which wool passes from the raw wool input R to the scoured wool output S, while liquor passes in counter current as indicated by arrows. The partially scoured wool then passes on to a series of immersion bowls 11a, 11b, 11c etc. (usually 3-4 bowls of about 5,000-10,000 l capacity each to be rinsed before entering the drier, to emerge later as fully scoured and dried product. These immersion bowls may be of the conventional or WRONZ type. They are also connected to each other and to the wash plate bowl 10c in counter current fashion as shown by arrows.

The counter current outflow from the bowl 11a to the bowl 10c is relatively small and equals the wet pick-up by the dry raw wool (0.5 l/kg.) together with any finite flowdown from the circuit of the wash plate bowls 10a, b or c that may be established. Thus, as shown in FIG. 1, two outflows are established from the bowl 11a, namely an outflow as counter current to the bowl 10c and a flowdown to the sewer (if 11a is a conventional immersion bowl) or to the HST (if 11a is a WRONZ bowl). In FIG. 1 the WRONZ circuit is shown in abbreviated form for simplicity of presentation, and only the HST tank 12 is shown, without the associated side tanks of 11a or 11b or the cream separator disc centrifuge which is incorporated in the WRONZ circuit (as distinct from the disc centrifuge 17) operating on the liquor from the scouring bowls 10a, b, c. The flow from the HST 12, to continue the WRONZ circuit, issues at 12a and after creaming or phase separation of this flow in the usual disc centrifuge of the WRONZ system, the middle phase and part or all of the jet phase are returned to the bowl 11a.

Liquor is drawn off at the bottom of bowl 10 and passed by a pump 13 through a heat exchanger 14 to a decanter centrifuge 15, which separates off a semi-solid sludge of dirt at 16 and delivers the centrate to a disc centrifuge 17. In this system the decanter centrifuge handles the total recycling flow, typically about 100 l/min.

The disc centrifuge 17 delivers three separated streams. At 18 the bottom or "jet" phase of about 25 l/min, at 19 the middle phase of about 75 l/min and at 20 the top or "cream" phase of about 5 l/min, which contains most of the lanolin. The latter is pumped to a thermal cracking tank 21 where it is separate into lanolin grease, withdrawn at L, and an aqueous sludge, removed at 22.

The jet and middle phases are collected in a recycle tank 23 and returned by a pump 24 to the wash plate scouring bowls.

For the addition of a silicate flocculating agent, in accordance with the first aspect of this invention, and preferably also a polyelectrolyte, a pH adjusting buffering agent and calcium or other divalent polyvalent ions the most appropriate point is at 25, immediately before the decanter centrifuge.

In another modification, exemplifying the second aspect of this invention and shown in FIG. 1 in broken lines, the jet phase delivered at 18 by the disc centrifuge 17 is recycled by a pump 26 to the decanter centrifuge 15, which thus has the opportunity to remove more dirt and other solids from it. This may be looked upon as an isolated jet phase parallel shunt.

In yet another modification, exemplifying the third aspect of the invention and shown in FIG. 1 in chain-dotted lines, provision is made at 27 in the lower region of bowl 10 for an intentional flow down of contaminated liquor. This flow down may be discharged to the sewer, but alternatively it may be diverted to the decanter centrifuge 15, either directly through a line 28 or through a holding or solids settling tank 29, (distinct from the WRONZ HST 12) from which the sludge of settled solids is removed at 30. When the tank 29 serves as a holding tank, its contents are treated in the decanter as time allows and when the decanter is idle and not needed for treating other liquors. If the partial flow down is discharged, fresh make-up water may be introduced into bowl 12, as indicated at 31, and may be used to rinse the outgoing wool, or the make-up balancing water may originate from bowl 11a as increased counter current flow.

Figure 2:
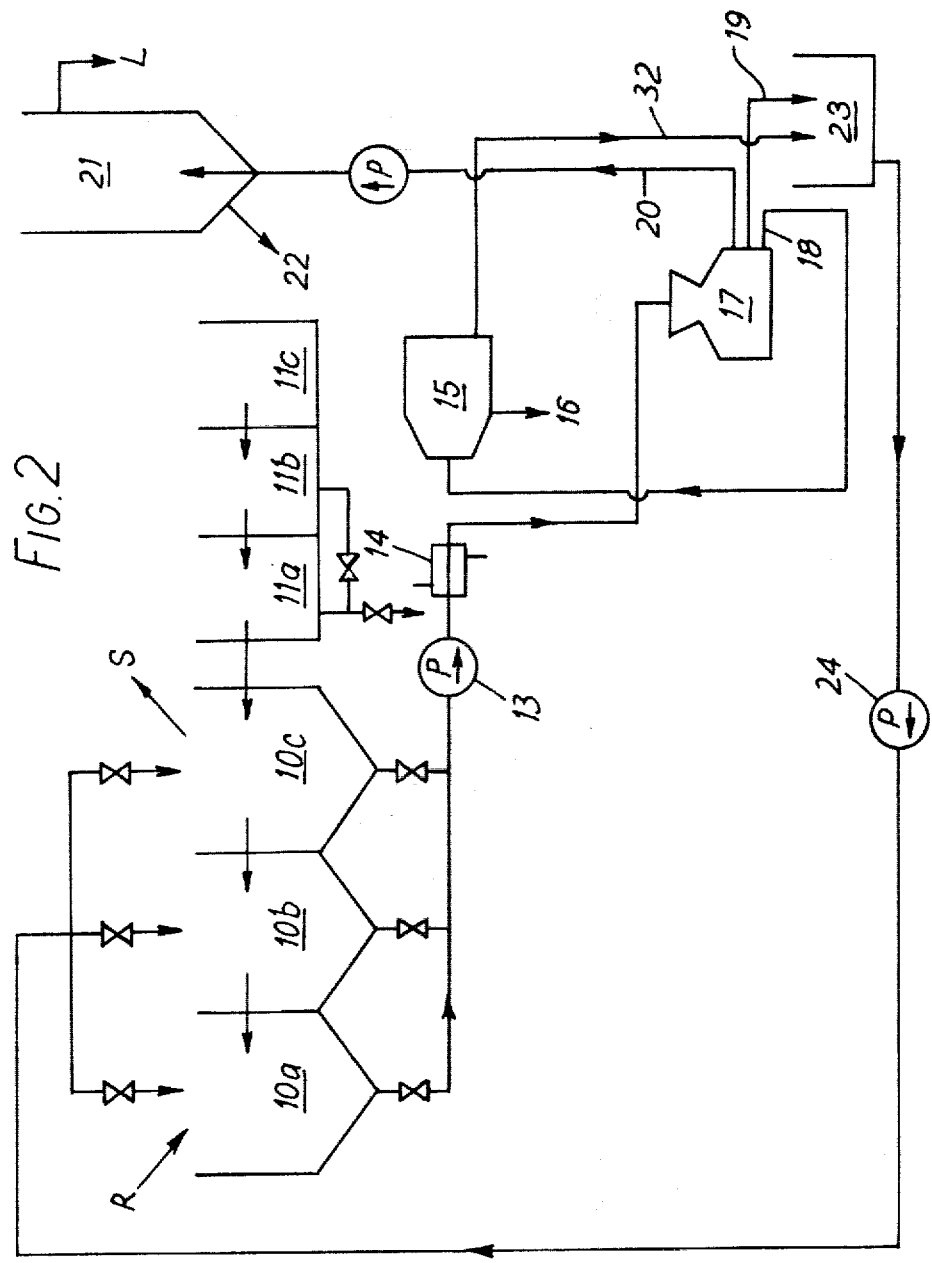
FIG. 2 is another flow diagram of a CSIRO "Lo-flo" system incorporating other features of this invention.

In FIG. 2 is shown as CSIRO system modified in accordance with the second aspect of the invention. As shown in this Figure, where the same numerals are employed to refer to the same elements as in FIG. 1, the liquor withdrawn from bowl 10 is passed through the pump 13 and heat exchanger 14 to the disc centrifuge 17 where it is split into three phases. The decanter centrifuge 15 receives only the jet phase from the outlet 18 of the disc centrifuge, and so has to handle only some 25 l/min. The cream phase is passed to the thermal cracker as before, while the recycle tank receives the middle phase at 19 and the centrate of the decanter centrifuge at 32. This arrangement may be looked upon as a reversed flow isolated jet phase loop.

Figure 3:
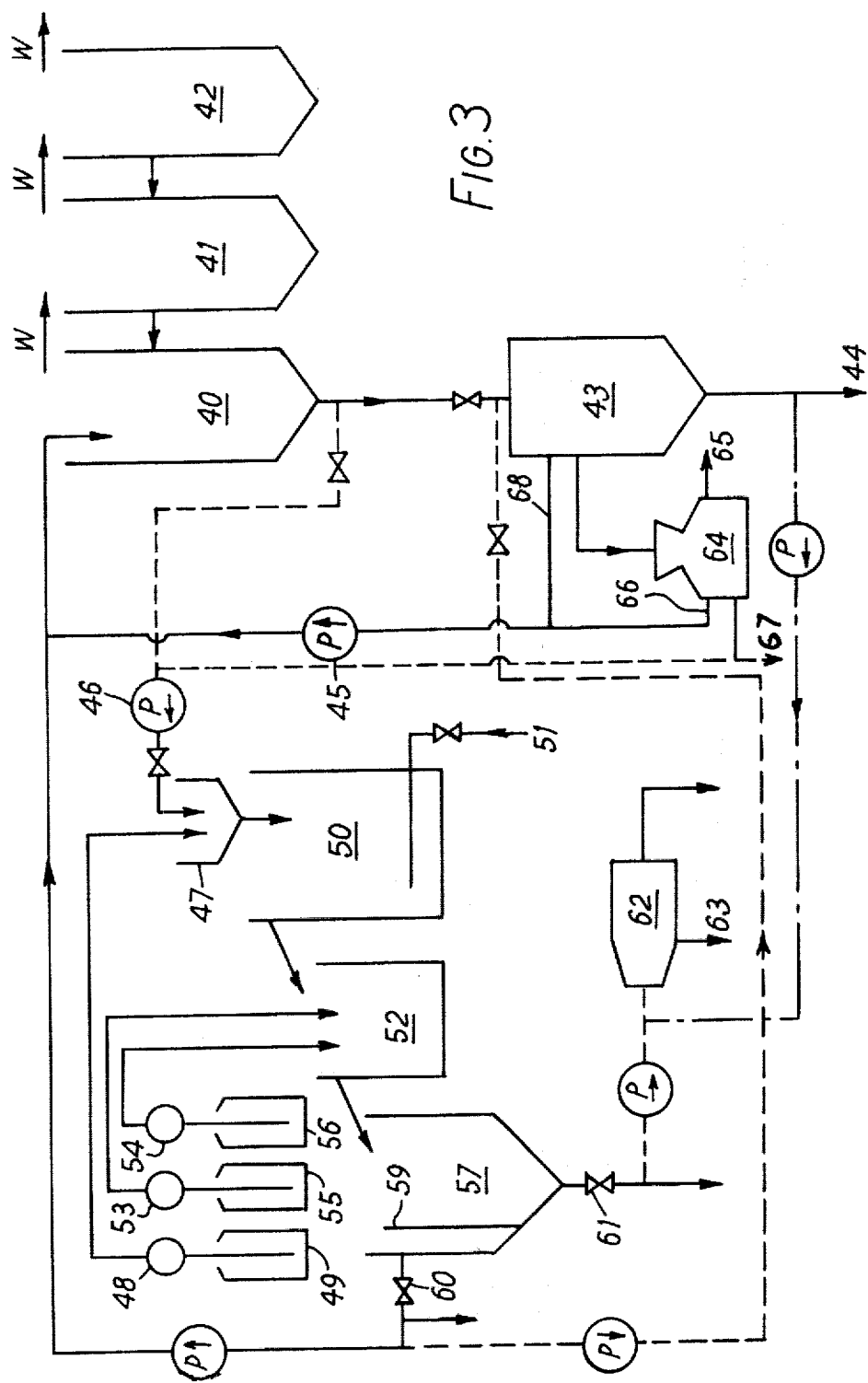
FIG. 3 is a flow diagram of a WRONZ wool scouring system modified to include features of the invention.

In FIG. 3 is shown a scouring plant arranged for recycling on the WRONZ system and modified in accordance with the first aspect of the invention for the treatment of the flow down with silicates.

A range of scouring bowls 40, 41 and 42 is provided, in which the wool W moves counter-current to the flow of liquor indicated by arrows between the bowls. Liquor withdrawn from the bottom of bowl 40 enters a heavy solids settling tank 43 whence a solids sludge is removed at 44. The clarified liquor from the tank 43 is recycled by a pump 45 to the bowl 40, either directly, in a short cut through line 68, or in accordance with the normal WRONZ circuit by passage through a disc centrifuge 64, from which the cream phase is removed at 65 and the middle phase at 66 is returned to the bowl 40, while the jet phase at 67 (which is usually dirty and has a high COD), instead of being let to drain or returned in part to the bowl 40, may be pumped by a pump 46 to an in-circuit effluent chemical treatment, preferably in accordance with the first aspect of this invention, for desludging and clarification.

In accordance with the first aspect of this invention, at least part of the flow down from bowl 40 is passed to in-circuit chemical treatment in reaction vessels interposed in the circuit. The partial flow down is drawn, as shown by broken lines, either from the bottom of the bowl 40 itself, by-passing the HST and the disc centrifuge, or through the centrifuge 64, as the jet phase 67. Alternatively, the flow down can be taken from the bottom of the HST tank at 44, this possibility not being shown in the drawing for the sake of clarity. The diverted flow down is passed by the pump 46 to a mixer chamber 47 where it is mixed with sulphuric, phosphoric or other acid, supplied by a metering pump 48 from a supply 49, and then enters a first reaction vessel 50. The contents of this vessel can be heated by steam supplied at 51. The contents of the vessel 50 overflows into a vessel 52 where they are mixed with a silicate solution and other chemical agents, such as agents for pH adjustment, calcium salts for suint soap precipitation or a polyelectrolyte supplied by metering pumps 53 and 54 from containers 55 and 56, and others as required.

The contents of the vessel 52 then overflow into a third vessel 57 having a hopper-shaped bottom 58 and a weir 59 leading to an outlet controlled by a valve 60. The vessel 57 serves as a settling tank, and a sludge stream can be withdrawn from the bottom of the hopper under the control of a valve 61, while a clarified supernatant stream is obtained at the valve 60.

The clarified supernatant liquor can then be recycled direct to the scouring bowls or, as again shown in broken lines, transferred to the settling tank 43. Alternatively, the clarified liquor can be discharged to the sewer as its COD will have been greatly reduced. The sludge stream at the valve 61 may optionally be further separated by passage through a decanter centrifuge 62 to provide a semi-solid sludge at 63 and a clarified centrate for discharge to the sewer. A further alternative, where the decanter centrifuge is provided, is for the sludge stream from the settling tank 43 to be transferred to the centrifuge 62, as shown in chain-dotted lines, where it can be further separated before discharge. These arrangements provide for an in-circuit effluent chemical treatment of the flow down to reduce its COD and possibly the volume before discharge, or potentially allow for re-use or recirculation of part of the treated liquor. Moreover, the circuitry connections may be arranged in any suitable way conforming to the counter current direction to treat circulating liquor from any point in the circuit as may be required in the in-circuit chemical reaction plant.

EXAMPLE 1

This example illustrates the effect of silicate and other chemical additives on contaminated scouring liquors.

A flowdown to sewer of about 2 m$^3$/hr, from a scouring line operating in accordance with the WRONZ system to process 1 ton raw wool/hour, had the following typical composition and properties: total solids 5.8%, grease 2.4%, suint 2.2%, and dirt (clay) 1.2%, pH 9.2; and chemical oxygen demand (COD) of 102,000 mg $O_2$/l.

The latter COD measurement correlates with biological oxygen demand and reflects the concentration of pollutants. The measurement is readily performed by methods known in the art.

Samples of the flowdown were used to perform the following trials with the indicated results:
 (a) The liquor was treated at a rate of 30 ml 40% sodium silicate ($SiO_2$:$Na_2O$ = 3.3:1) solution per liter. A settlable precipitate formed; the supernatant had a COD of only 21,000 mg $O_2$/l.
 (b) A trial was conducted as at (a) except that after silicate addition the pH, which rose above the original 9.2, was adjusted with HCl to pH 9.0. The supernatant had a COD of 25,800 mg $O_2$/l.
 (c) The liquor was treated at a rate of 50 ml 10% sodium silicate ($SiO_2$:$Na_2O$ = 2:1) solution per liter. The pH obtained was 10.2 and this was adjusted to pH 5 with HCl. The precipitated gel settled rapidly and the supernatant had a COD of 17,100 mg $O_2$/l.
 (d) A trial was conducted as at (c) except that pH adjustment was to pH 9.4, using calcium chloride instead of HCl. The supernatant had a COD of 15,000 mg $O_2$/l.
 (e) A trial was conducted as at (d) except that more calcium chloride was used to lower the pH to 8.3. The supernatant liquor had a COD of 13,800 mg $O_2$/l.

In the above tests, settling of flocculated gel precipitate occured more rapidly when the pH was near neutral rather than alkaline, and the supernatants were clear amber in colour and showed no grease or dirt by analysis. Moreover, many variations on the above tests were done with different types of silicates and mixtures thereof, with pH adjustments to different values and with different agents, and with and without use of polyelectrolytes as settling aids, with essentially similar results.

EXAMPLE 2

Similar tests to those described in Example 1 were carried out using liquor from the first bowl of the WRONZ line instead of the flowdown, with similar results. For example, liquor was treated at a rate of 20 ml 40% sodium metasilicate pentahydrate ($SiO_2$:$Na_2O$ = 1:1) per liter and the pH adjusted to 6.5 with HCl to give a supernatant of 27,900 mg $O_2$/l COD as compared with a COD of 147,500 mg $O_2$/l for the original untreated liquor.

EXAMPLE 3

Tests similar to those described in Examples 1 and 2 above were done using liquor from a scouring line operated in accordance with the CSIRO process of the Belgian patent. The liquor was from the second section (bowl) of the 'Lo-flo' unit. Its analysis was: 19.6% total solids, 4.6% grease, 12.6% suint and 2.4% dirt. Similar results were obtained. A grainy gel precipitated and a top grease layer separated, with a clarified aqueous phase of much reduced COD in between. Further, the clarity of the aqueous layer and quality (sharpness and rapidity) of separation were ranked in the following decreasing order, depending on indicated treatment:
 1. silicate, neutralization and polyelectrolyte aids (e.g. Zetags 92, 292, 22, 51, or 88 N; or Magnafloc 155, 455 or 156; or Praestol 444K).
 2. silicate and neutralization.
 3. silicate and polyelectrolyte aids (alkaline, without neutralization).
 4. silicate alone (alkaline, without neutralization).
 5. polyelectrolyte and neutralization.
 6. polyelectrolyte aids alone.

EXAMPLE 4

A trial was done with a small bleed from the flowdown from a scouring line operating in accordance with the WRONZ as depicted in FIG. 3. The three reaction vessels 50, 52 and 57 had respective capacities of 0.5, 0.1 and 2.0 m$^3$ approximately. The contents of the vessel 50 were maintained hot (about 70° C.) by steam, and the stream of WRONZ flowdown was admitted at 0.8–0.9 m$^3$/hr. Concentrated sulphuric acid was simultaneously metered (via the mixer chamber 47) at a controllable rate to neutralize and adjust the pH of the resulting flow into the vessel 50. Silicates or polyelectrolytes were metered into the vessel 52 to deliver desired rates to the liquors received from vessel 50. The treated liquor overflowing into vessel 57 was allowed to settle. When vessel 57 filled, the sludge stream from the hopper bottom and clarified stream from the side outlet were continuous as long as vessel 50 continued to receive the flow down. The proportion of the sludge and clarified streams could be adjusted, and the sum of both streams balanced the flow into vessel 50 (and metered flow of chemicals into vessel 52).

Tests were carried out based on the results of Examples 1 to 3, and the following observations were made:
 (a) Acidifcation of the flow down to pH 3 in itself induced formation of a fine precipitate which however did not settle readily. Addition of Zetag 92 (few parts per million in the liquor) induced rapid flocculation and settling in the acidified liquor. The treated liquor had a COD of 21,500.
 (b) Similar results to (a) were also obtained when the pH was maintained near neutral (6.8) by reducing the rate of metering of sulphuric acid.
 (c) With the liquors at pH 6.8, use of silicate (about 0.2% in the liquor) gave a readily settlable precipitate.

In this test, the clarified stream had a low COD (about 24,000) and could be returned to the first bowl 40 or to the heavy solids settling tank 43 for re-circulation, thus reducing the COD load, but could equally let to sewer. Also, the settled sludge stream (estimated 20% solids) was pumped for a test period to the decanter centrifuge 62 which produced from it a semi solid sludge of about 50% solids.

EXAMPLE 5

Laboratory scouring trials with silicates were compared with similar tests with soda scouring, the following being tested: (a) a mixture of soda and sodium metasilicate ($SiO_2$:$Na_2O$ = 1.1); (b) metasilicate alone (different concentrations); (c) different proportions of various silicates of various $SiO_2$:$Na_2O$ ratios (1:1, 2:1, 3.3:1); and (d) silicate mixture as in (c) plus phosphate buffers (potassium dihydrogen phosphate and dipotassium hydrogen phosphate). The use of mixtures of silicates of various $SiO_2$:$Na_2O$ ratios was based on laboratory observations that silicates with low ratio (higher alkalinity) were superior for scouring and extracting the grease and contaminants from the raw wool, while those with higher ratios performed better in de-emulsifying the scour liquors, facilitating separation of sludge and dirt as well as grease and thus clarifying the liquors.

In mill operation both the superior scouring and superior desludging functions would be desirable.

The use of a buffer was intended to secure control over pH fluctuation of the scour liquor, especially since, when the silicates (which provide alkalinity) were precipitated out with the sludge, thereby becoming insoluble and excluded from the system, the pH tended to drop rapidly.

These laboratory trials demonstrated the effectiveness of the silicates for scouring, with no adverse effect on the wool as measured by alkaline solubility and staining tests on the scoured wool. Further, the use of silicates facilitated de-emulsification of the scour liquors and recovery of high quality top grease, as well as separation of a readily settlable sludge of clay and organic matter. These findings have been corroborated by observations at the mill and by analyses of liquors obtained when silicate was substituted for soda for scouring in the first two bowls of a 'Lo-flo' unit. Another advantage of using silicates in lieu of soda for scouring is that the silicates, also desirable for desludging and de-emulsifying the liquors of WRONZ and CSIRO systems, are then already present in the system and obviate the need for further addition, thus cutting the cost of chemicals. The silicates were employed at the scouring line at about 4–8 Kg/hr (i.e. per ton raw wool moving through the line per hour), equivalent to 0.4–0.8% o.w.w. with satisfactory results.

EXAMPLE 6

The following trial illustrates the usefulness of disposing an intentional finite flow down in the circuit of a CSIRO 'Lo-flo' system for desludging the liquors for smooth sustained operation without circulation flow problems or breakdowns.

The scouring line shown in FIG. 1 was processing about 1 ton/hour raw wool. Silicate (about 0.4% o.w.w.) was used in lieu of soda. A minor flow down of 3–17 l/min as at 27 was established from the bottom of the bowl 10 and the liquor loss to the circuit was compensated by balancing with river water injected at 31 into the bowl 12 as a rinse on wool leaving the bowl. The rinse water moved in counter-current direction towards bowl 10 of the unit through the action of level float valves. The trial extended over a 4-day period of about 5–6 hours a day without dropping the starting liquors in the bowls, except through the minor flow down which was maintained at 17 l/min for the first day, 8 l/min for the first half of the second day and 3 l/min for the second half; the third and fourth days were operated with 5 and 6 l/min flow down respectively.

Throughout the run, operation was smooth and without flow disturbances or foaming or other breakdowns necessitating shutdown. It appeared that operation could have been continued indefinitely. Further, good recovery of clean grease was obtained and the scoured wool was very clean, as judged both visually and by analysis, and appeared brighter than when operating without a flow down and without silicates.

Calculations from analysis of the flow down indicated that this route alone achieved removal of the following percentages of the theoretical amount of dirt introduced into the circuit liquors (on a basis of 70% raw wool contaminants removal in the 'Lo-flo' unit): 43, 26, 14 and 17% for days 1–4 respectively. The COD of the flow down varied between 200,000–300,000 mg $O_2$/l.

Samples of the flow down were subjected to centrifuging at $2300 \times g$, which resulted in satisfactory separation of clean light colour top grease layer and precipitation of a settled clay and sludge, leaving a clarified aqueous layer in between. This demonstrated the potential effectiveness of treating the flow down in the decanter centrifuge 15 (directly or via a holding or settling tank 29, as shown in FIG. 1 in chain-dotted lines) to effect separation of sludge and grease, and perhaps re-circulation of part of the aqueous phase, thus reducing the volume and COD of the flow down to sewer.

EXAMPLE 7

The following trials illustrate the effectiveness of silicate for sludge removal from circulated scour liquors by decanter centrifuge, especially when the liquor flow circuit is modified.

(a) A system was used as shown in full lines in FIG. 1. The conditions of operation were: 1 ton raw wool/hour, scouring with soda. Liquor circulation of about 100 l/min (or 6.0 m$^3$/hr) was from the bowls 10–12 to the decanter centrifuge 15 (only $700 \times g$) to the cream separator disc centrifuge 17 and the aqueous effluent (i.e. the middle and jet phases minus the cream) from the tank 23 back to the bowls. The cream phase was passed to the thermal cracking tank 21 for grease recovery. In other words, the circulation flow followed the known sequence. owing to the inefficiency of the decanter, semi-solid sludge removal by the decanter was only 1–3 Kg/hr (about 50% total solids) when operated in this manner.

(b) The system of FIG. 1 was operated as in (a) except that a solution containing about 10% sodium metasilicate ($SiO_2$:$Na_2O$, 1:1) plus 4% of sodium silicate having $SiO_2$:$Na_2O$ ratio of 3.3:1 was metered at 1 l/min into the inlet port 25 of the same decanter to mix with inlet scour liquor. This arrangement resulted in production by the decanter of about 40 Kg/hr of semi-solid sludge of about 50% solids.

(c) A system as shown in FIG. 2 was used. The general conditions were as in (a) except that the course of liquor circulation was changed. Instead of the normal flow of FIG. 1, the liquor (100 l/min) flowed directly from the bowls 10–12 to the disc centrifuge 17 first rather than via the decanter 15. From the disc centrifuge the cream phase (about 5 l/min) was diverted to the thermal tank 21 as in (a), but only the middle phase (about 70 l/min) was returned to the bowls, while the jet bottom phase (about 25 l/min and enriched with dirt) was fed to the same decanter 15. In this way the liquor flow load on the decanter was only about 25 l/min of a liquor that was rich in dirt, rather than 100 l/min of a liquor relatively less concentrated in dirt as in test (a). The centrate stream from the decanter 15 was also returned to the bowls. Despite the reduced load of liquor flow rate to the decanter, semi-solid sludge removal by the decanter continued low at a few Kg/hr. This circuit modification of FIG. 2, however, is effective in principle for sludge removal, as shown by (d), (e) and (f) below. Another way of subjecting the jet phase to more intensive centrifugal action in the decanter 15 can be achieved by the sequence of flow shown in broken lines in FIG. 1, namely, from bowls to decanter to disc centrifuge and the return of only the middle phase from disc to bowls, while the jet phase is directed to the decanter.

(d) The liquor flow and operation were as in (c) except that an 0.05% solution of a polyelectrolyte flocculant aid, Zetag 92, was injected at the decanter inlet 25 at a rate of 1.3 l/m. Sludge production rose to 89 Kg/hr and the sludge had about 50% solids content.

(e) The liquor flow and operation were the same as in (c) except that a solution of 12% sodium metasilicate was introduced to the inlet port 25 of the decanter at about 1 l/min. A sludge (50% solids) production of 49 Kg/hr was obtained.

(f) The liquor flow and operation were as in (c) except that both Zetag 92 and sodium metasilicate were introduced into the decanter 15 at the same rates as in (d) and (e). The sludge (50-60% solid) production obtained was 180-202 Kg/hr over a series of test periods.

EXAMPLE 8

Trials similar to those in Example 7 were carried out except that: (1) a more efficient decanter having capability of 2300×g centrifugal force was used; (2) sodium metasilicate (0.3-0.8% o.w.w.) was used in the bowls instead of soda; (3) the circuit liquor flow followed a normal path, i.e. similar to the design of FIG. 1 (Example 7a). The following observations were made:

(a) When operation was conducted without injection of extra silicate or polyelectrolyte at the decanter end, semi-solid sludge production was about 10 Kg/hr.

(b) When 1.2 l/min of 0.1% Zetag 92 was metered to the decanter 15, sludge production rose to 165 Kg/hr. (Note that silicate was being used for scouring instead of soda and thus was already present in the decanter inlet liquor).

(c) Operation was conducted as in (b) except that extra silicate, in addition to that used in the bowls in lieu of soda, was injected at a rate of 1 l/min of 6% solution at the decanter end 25. No appreciable further improvement in slude production was obtained, indicating that a sufficient level of silicate was already achieved in (b).

It was also noted in tests (b) and (c) that the scoured wool was very clean and showed no damage and that very clean, light-colour cream, high in grease content, was recovered by the disc centrifuge.

We claim:

1. In a method of scouring raw wool wherein scouring liquor is withdrawn from the scouring zone and passed through a circulatory system where it is treated to remove solid contaminants therefrom and subsequently recycled to the scouring zone, the improvement consisting essentially of adding a soluble alkali metal silicate to the scouring liquor prior to the separation of solid contaminants.

2. A method according to claim 1 wherein solids are removed from the liquor by means of a centrifuge and the silicate is added to the liquor immediately before it enters the centrifuge.

3. A method according to claim 1 wherein the silicate has a molar alkali to silica ratio of 1:1 to 1:4 and is used in an amount of 0.1 to 2% of the weight of wool being scoured.

4. A method according to claim 1 wherein a polyelectrolyte is also added to the circulating liquor.

5. A method according to claim 1, wherein a minor proportion of the liquor is regularly removed from the circulatory system during the course of operation.

6. A method according to claim 5 wherein the circulating liquor is fed to a disc centrifuge and the bottom or jet phase separated by the latter is passed to a decanter centrifuge for separation of solids therefrom, and the liquor from the latter is recycled directly or indirectly to the scouring vessel.

7. A method according to claim 6 wherein the liquor withdrawn from the scouring vessel is fed first to the disc centrifuge where a top or cream phase is separated for recovery of lanolin, and the middle of liquor phase is recycled to the scouring vessel together with the liquor from the decanter centrifuge.

8. A method according to claim 6 wherein the liquor withdrawn from the scouring vessel is fed first to the decanter centrifuge for removal of solids therefrom, and thence to the disc centrifuge where a top or cream phase is separated for recovery of lanolin, a middle or liquor phase is recycled to the scouring vessel and the bottom phase is recycled to the decanter centrifuge as aforesaid.

9. A method according to claim 6 wherein the minor proportion of liquor withdrawn from the circulatory system is returned to the system at a point before the decanter centrifuge.

10. In a method of scouring raw wool wherein scouring liquor withdrawn from the scouring zone is recycled to the scouring zone for further use after separation of solid contaminants, the improvement consisting essentially of adding a soluble alkali metal silicate to the scouring liquor prior to the separation of solid contaminants.

* * * * *